Sept. 10, 1929.  R. W. JOY  1,727,711
ARTICULATED CAR
Filed Dec. 1, 1927  2 Sheets-Sheet 1

INVENTOR
Robert W. Joy
BY
ATTORNEY

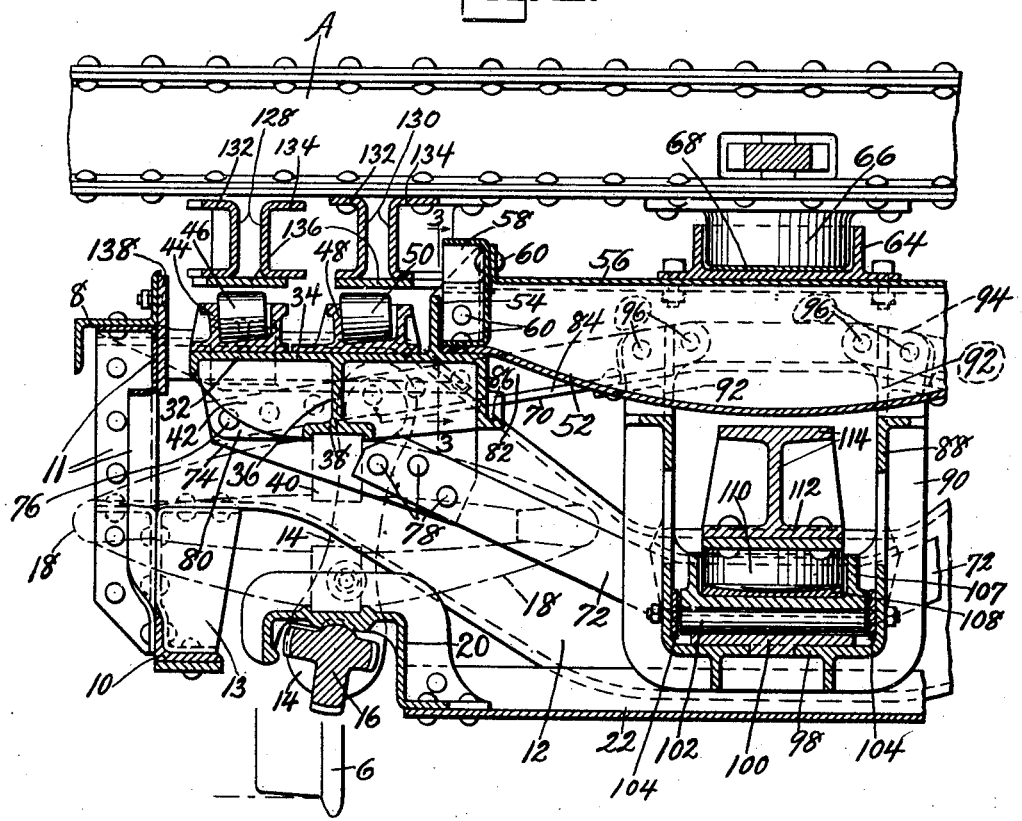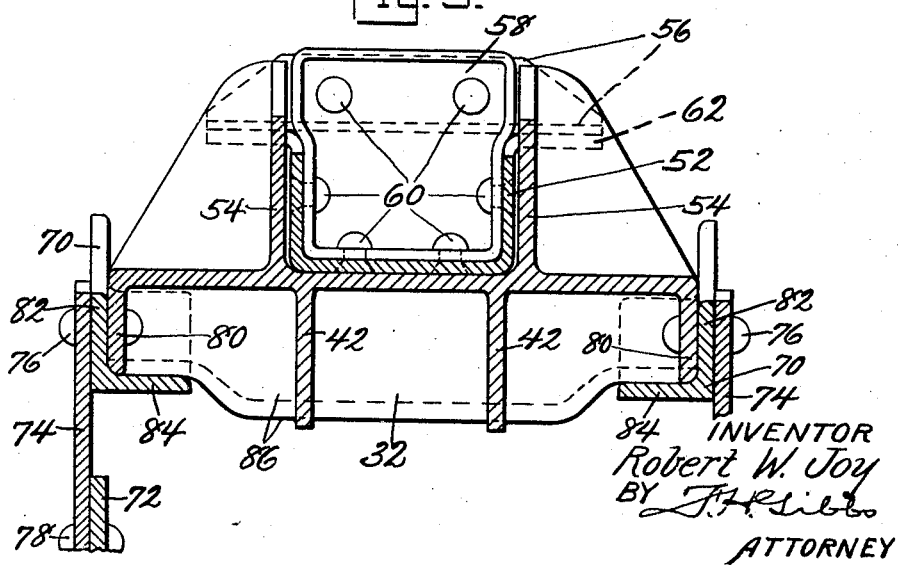

Patented Sept. 10, 1929.

1,727,711

UNITED STATES PATENT OFFICE.

ROBERT W. JOY, OF BROOKLYN, NEW YORK, ASSIGNOR TO AMERICAN CAR AND FOUNDRY COMPANY, OF NEW YORK, N. Y., A CORPORATION OF NEW JERSEY.

ARTICULATED CAR.

Application filed December 1, 1927. Serial No. 237,013.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In the drawings:

Fig. 2 is a sectional view taken on the line 2—2 of Fig. 1;

Fig. 3 is a sectional view taken on the line 3—3 of Fig. 2; and

Figure 1:
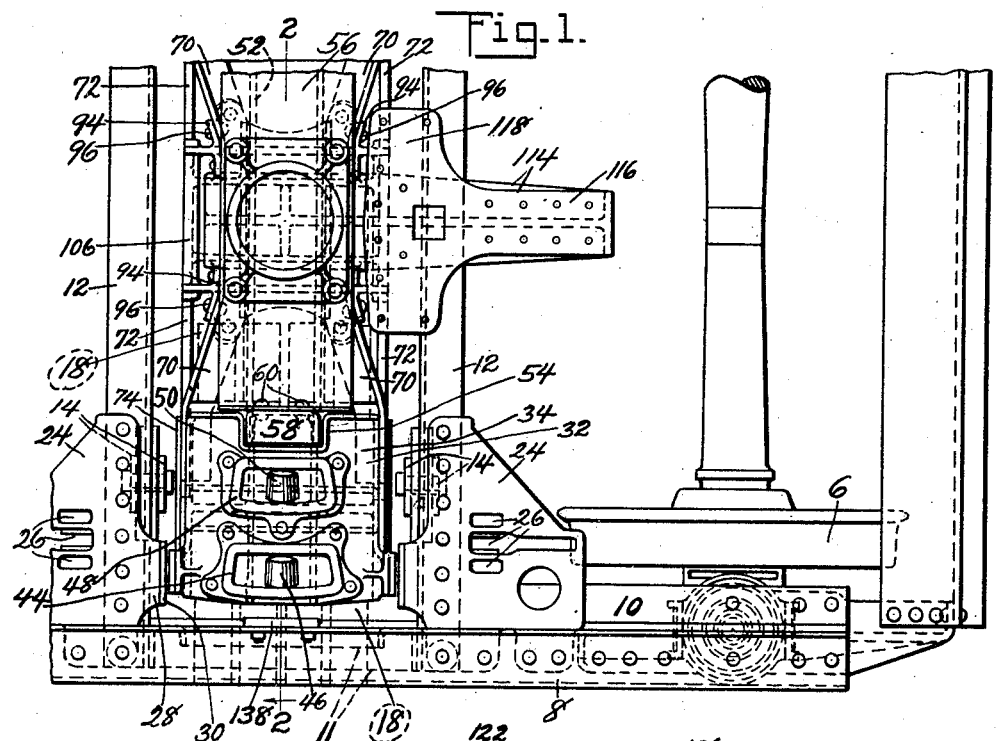
Figure 1 is a partial top plan view of the truck forming a part of the present invention.
Figure 4:
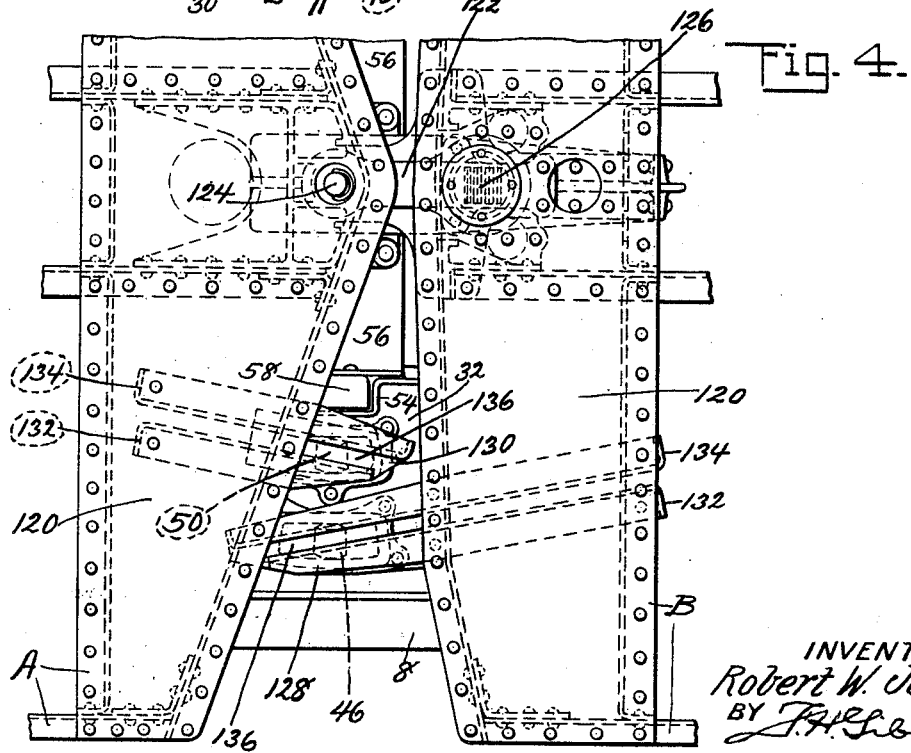
Fig. 4 is a partial top plan view of the adjacent ends of two car bodies, the truck being in greater part omitted.

This invention relates to transportation cars and has particular reference to railway cars of the articulated unit type.

One object of the present invention is to provide an improved means for supporting the adjacent ends of two car bodies on a single car truck whereby to permit free relative movement between said bodies.

A further object of the invention is to provide an articulated car unit for supporting the adjacent ends of car bodies, the unit including a car truck having a pair of bolsters each of which is provided with a center bearing, each center bearing supporting one of the car ends.

A still further object is to provide a railway car of the articulated unit type, more specifically, the provision of a truck for supporting the adjacent ends of two car bodies, formed of few parts and which is strong and durable in operation.

Other objects and advantages of this invention will be apparent from the following description, taken with the accompanying drawings, in which the preferred type of the present invention is clearly illustrated. Referring to the drawings more in detail, the invention includes a car truck mounted on wheels 6 and having a frame including the usual pedestals, the top chords 8 in the form of Z-bars, the trusses 10, and a center brace 11. The truck is further provided with spaced transoms 12 which are secured to the top chords 8, center brace 11 and a pressing 13 secured to the center brace and the truss 10, all as clearly shown in Fig. 2. From the transoms 12 are hung the swing links 14 which support the swing link adjuster or crossbar 16. The cross bar 16 may be adjusted in any suitable manner and it supports the elliptic springs 18. Mounted on the adjustable crossbar 16 is the reinforced truck spring seat 20 to which is secured the spring plank 22. The transoms 12 are not straight from side to side of the truck but are provided with a dipped portion substantially midway of their ends for a purpose hereafter to be described. The top chords 8 and transoms 12 are connected and reinforced by gussets 24 (see Fig. 1) provided with apertures 26 for the reception of the brake levers and hangers, not shown, and are each provided with a depending protruding element 28 having a wear plate 30 secured thereto.

The elliptic springs 18 support spring caps indicated generally at 32 in Fig. 2, wherein is clearly shown the construction thereof. As shown in this figure, these spring caps each comprise a supporting plate 34 provided with a depending leg 36 terminating in a recessed base 38 which seats on the spring band 40. The plate 34 is reinforced by suitable webs 42 and supports a socket 44 which receives a bearing 46. Also secured to the plate 34 is a second socket 48 receiving a bearing 50.

An upper bolster indicated generally at 52 is provided which is supported by the spring cap. Referring now to Fig. 1, it can be seen that the inner edge of the plate 34 is provided with a retaining guide defined by the upstanding flanges 54 into which guide the end of the bolster 52 extends. The bolster 52 is substantially a channel and is provided with a cover 56, and at the end of said channel, a retaining element 58 in the form of a diaphragm is provided which is more particularly of the form shown in Fig. 3. The retaining element 58 is secured to the bolster 52 and cover 56 by means of suitable rivets 60, thus providing a rigid connection of the diaphragm 58 with the bolster 52. The bolster 52 is provided with laterally extending flanges 62 (see Fig. 3), and the cover 56 is provided with a truck center plate 64 which swivelly receives body center bearing 66 secured to the end of car A. The bolster 52 is firmly seated in the pocket defined by the upstanding flanges 54 formed on the spring cap 32, and the arrangement is such as to prevent relative movement between the bolster and the spring cap but to permit the bolster 52 to be easily and quickly removed from the pockets before-mentioned, in case of necessity, as will be evident from the disclosure in Fig. 3. From the description just given, it is apparent that there has been constructed a rigid connection of the end of car A to the spring cap, through the medium of the body center bearing 66 and the bolster 52, and due to the specific connection of the bolster 52 with the spring cap, there is no relative lateral movement between said bolster and said spring cap. If desired, a bearing plate 68 may be employed on the bottom of the socket 64, as clearly shown in Fig. 2.

With this invention, a second bolster is provided which is in general arranged below the before-mentioned bolster 52, and said second bolster is a truss bolster consisting of the upper or compression members 70 and the lower or tension members 72. The ends of the compression and tension members are connected together by means of a gusset 74 secured to said compression and tension members by rivets 76 and 78 respectively. This truss bolster is rigidly connected to the spring caps as clearly shown in Fig. 3, the spring cap 32 being provided with depending side flanges 80 against which the vertical leg 82 of the compression members is positioned; the horizontal legs 84 of the compression members extending inwardly adjacent the webs 86 of the spring cap; all as clearly shown in Fig. 3.

The compression members 70 are bowed inwardly substantially midway between their ends, as clearly shown in Fig. 1, and a lower center bearing casting, indicated generally at 88, is provided, the latter having spaced reinforcing webs 90 which extend completely around the casting and above the same, as at 92, and terminate in attaching ears 94 to secure the casting to the compression members by means of rivets 96 or the like; the webs 90 and the extended portions 92 and ears 94 serving to reinforce the center bearing casting and the compression members 70 at the bowed portions of the latter. The casting 88 is generally of the form shown clearly in Fig. 2, and is provided with a bottom 98 in which is a bearing plate 100 which latter supports bearings 102 preferably of the roller type. For an obvious reason, the casting is provided with wear plates 104. The lower end of the casting is flanged as at 106 to bear upon and be supported by the tension members 72 of the truss bolster, and positioned within the casting 88 and riding on the bearings 100 is a socket 107 having a bearing plate 108 upon which is swivelly seated a body center bearing 110 carried by the offset lower end 112 of a cantilever arm 114 secured to and extending downwardly from the end of car B. As heretofore mentioned in this description, the transoms 12 are dipped intermediate their ends, thus permitting the positioning of the cantilever bar 114 as will be apparent. In Fig. 1, the cantilever bar is more specifically shown, the same comprising the attaching portion 116 and an enlarged head portion 118, this bar being preferably of the form shown in my co-pending applications filed December 1, 1927, Serial Nos. 237,012 and 237,014, respectively.

The ends of cars A and B are provided with cover plates 120 and the car ends are specifically connected by means of a drawbar 122 which is retained in connected relation with car A by means of a coupling pin 124, the drawbar being apertured at its other end for the reception of a resilient connector 126, such as a spring or the like, whereby to connect the drawbar with the car B.

Extending from the ends of cars A and B in such position as to overlie the bearings 46 and 50 are body side bearings indicated generally at 128 and 130 respectively. The side bearings are preferably of the type shown in Fig. 2, and each comprise spaced pressed channels 132 and 134 respectively, secured to the respective car ends with the lower chords of said channels connected by wear plates 136. The side bearings 130 of car A are positioned within the bearings 128 of car B, and said bearings are so arranged as to overlap each other and to permit relative movement of the cars A and B without contact between said side bearings. It will be apparent that the bearings 130 are necessarily arranged within the bearings 128 in order that they may contact with the bearings 50, as will be obvious.

Secured to the top chords 8 of the truck frame and to the center brace 11 is a wear plate 138 for the purpose of taking lateral impact of the entire bolster assembly, it being apparent due to the swing links 14, under certain conditions, the entire bolster assembly will oscillate. Extreme oscillation will cause impact of the assemby with the truck side frame which will be taken by the wear plate 138.

What is claimed is:

1. In an articulated car construction, a car truck having springs, a spring cap carried by said springs, a plurality of bolsters rigidly connected to said spring cap, and a car end supported by each bolster.

2. In an articulated car construction, a car truck, a plurality of bolsters mounted in the truck and connected to eliminate relative movement therebetween, and a car end supported by each bolster.

3. In an articulated car construction, a car truck, a plurality of connected bolsters mounted in the truck, car ends overlapping the truck and a center bearing carried by each bolster for supporting the car ends.

4. In an articulated car construction, a car truck, a plurality of connected bolsters in the truck arranged one above the other, car ends overlapping the truck, and center bearings arranged one above the other carried by said bolsters for supporting the car ends.

5. In an articulated car construction, a car truck having springs, spring caps carried by said springs, an upper bolster secured to and movable with the spring caps, a lower bolster secured to the spring cap, car ends overlapping the truck, and vertically arranged center bearings supported by the bolsters for supporting the car ends.

6. In an articulated car construction, a car truck having springs, a pair of bolsters arranged one above the other connected for simultaneous movement relative to said springs, and car ends overlapping the truck and swivelly connected to the bolsters.

7. In an articulated car construction, a car truck having springs, a spring cap, car ends overlapping said truck, side bearings mounted on the spring cap, a pair of bolsters connected to said spring cap and restrained against relative movement, and center bearings arranged one above the other for swivelly supporting the car ends.

8. In an articulated car construction, a car truck, a pair of bolsters, means mounting said bolsters for simultaneous movement and restraining them against relative movement, car ends overlapping the truck, side bearings supported by the bolster mounting means, and center bearings supported by the bolsters one above another for supporting the car ends.

9. In an articulated car construction, a car truck, a pair of bolsters, a spring cap to which the bolsters are rigidly secured permitting simultaneous movement but restraining them against relative movement, side bearings carried by the spring cap, car ends overlapping the car truck, and center bearings carried by the bolsters and arranged one above the other in substantial vertical alinement for supporting the car ends.

10. In an articulated car construction, a car truck, a spring cap, an upper bolster, a retainer for rigidly connecting the upper bolster and spring cap, a truss bolster rigidly connected to the spring cap and having its tension members arranged below the upper bolster, car ends extended over the truck, a center bearing supported by the upper bolster for supporting one car end, and a second center bearing supported by the before-mentioned tension members below the first named center bearing for supporting the other car end.

11. In an articulated car construction, a car truck, a spring cap, an upper bolster, a retainer for rigidly connecting the upper bolster and spring cap, a truss bolster rigidly connected to the spring cap and having its tension members arranged below the upper bolster, side bearings supported by the spring cap, car ends extended over the truck, a center bearing supported by the upper bolster for supporting one car end and a second center bearing supported by the before-mentioned tension members below the first named center bearing for supporting the other car end.

In witness whereof I have hereunto set my hand.

ROBERT W. JOY.